United States Patent [19]

Shedd

[11] Patent Number: 4,745,603
[45] Date of Patent: May 17, 1988

[54] CODE SEQUENCE GENERATOR FOR A DIGITAL TRANSMISSION LINE FAULT LOCATION SYSTEM

[75] Inventor: Dennis A. Shedd, Lexington, Mass.

[73] Assignee: American Telephone and Telegraph Company, AT&T Bell Laboratories, Murray Hill, N.J.

[21] Appl. No.: 866,903

[22] Filed: May 27, 1986

[51] Int. Cl.$^4$ .............................................. H04M 3/26
[52] U.S. Cl. .......................................... 371/27; 379/4
[58] Field of Search .................... 371/27, 22; 364/717; 375/10; 379/4

[56] References Cited

U.S. PATENT DOCUMENTS

| | | | |
|---|---|---|---|
| 3,596,245 | 7/1971 | Finnie et al. | 371/22 X |
| 3,725,860 | 4/1973 | Kemper et al. | 371/22 |
| 3,986,168 | 10/1976 | Anderson | 371/27 |
| 4,348,597 | 9/1982 | Weber | 364/717 |
| 4,408,298 | 10/1983 | Ruhland | 364/717 |
| 4,493,046 | 1/1985 | Watanabe | 364/717 |
| 4,507,621 | 3/1985 | Meyer | 364/717 |

OTHER PUBLICATIONS

The Digital Logic Handbook, Digital Equipment Corporation, 1966, p. 121.
"Understanding Pseudo-Random Circuits", *Radio Electronics*, D. Lancaster, Apr. 1975, pp. 42-49.
"Measuring Digital Error Rate with Pseudorandom Signals", *Telecommunications*, E. S. Donn, Nov., 1971, pp. 28, 30, 32, 62.

Primary Examiner—Charles E. Atkinson
Attorney, Agent, or Firm—Richard B. Havill

[57] ABSTRACT

A digital transmission line fault location signal generator includes a maximal length linear feedback shift register having m stages for generating a first pseudorandom sequence of binary signals with a period $2^m - 1$. The first pseudorandom sequence of binary signals is delayed by n time slots into a second pseudorandom sequence of binary signals. A circuit merges the first and second pseudorandom sequences of binary signals into a combined sequence of signals on the digital transmission line.

4 Claims, 2 Drawing Sheets

U.S. Patent  May 17, 1988  Sheet 1 of 2  4,745,603
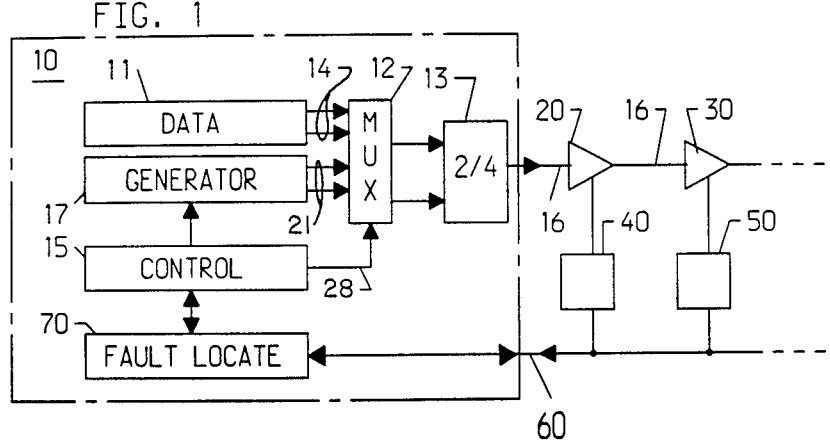
FIG. 1
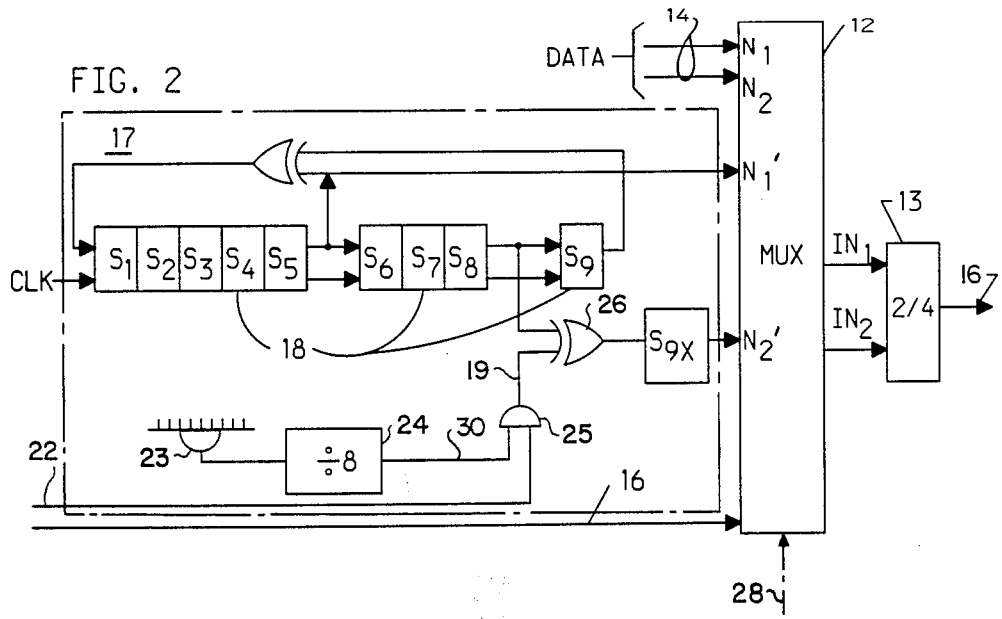
FIG. 2
FIG. 3
TABLE A
| $IN_1$ | $IN_2$ | OUTPUT LEVEL |
|---|---|---|
| 0 | 0 | +3 |
| 0 | 1 | +1 |
| 1 | 1 | −1 |
| 1 | 0 | −3 |

CODE SEQUENCE GENERATOR FOR A DIGITAL TRANSMISSION LINE FAULT LOCATION SYSTEM

BACKGROUND OF THE INVENTION

This invention relates to a digital transmission line test code generator which may be more particularly described as a generator for generating a quasirandom sequence of four-level signals.

Error rate measurements are made on digital transmission lines to provide information indicating the quality of transmission such as excellent, good, fair, poor, and failed. Error rate can be determined by checking parity on an in-service basis or by an out-of-service test using a pseudorandom code sequence. Error rate measurements typically are made on an end-to-end basis because the in-service test requires recovery of framing at the location where the measurement is being made and because the out-of-service test requires external test sets. Recovery of framing is prohibitively expensive at each repeater along the transmission line.

Separate fault location circuits and equipment are being provided for locating suspected or known faults along a transmission line. Typically an individually assigned supervisory signal frequency is uniquely associated with each repeater location for purposes of polling the repeaters for fault location testing. By polling the repeaters with the uniquely assigned frequencies, it is possible to determine where a failure is located.

There are problems resulting from these testing arrangements. When the repeaters with the separate circuits are polled, it is possible to locate a complete failure in the system, but the location of a soft failure producing degraded operation is very difficult to determine. On the other hand, the known error rate monitoring arrangements, which test from end-to-end, can readily determine that a soft failure is affecting operation, but those known arrangements cannot readily determine where the soft failure is located.

It is desirable to develop an error rate measurement system which operates on a section-by-section basis for determining the location of any failure. A pseudorandom code sequence can be used for initiating remote error testing on regenerators along a digital transmission line. To use such a pseudorandom code sequence for testing raises problems because the detector that would be required at every repeater location is complex and because errors appear to multiply as they go through these detectors.

SUMMARY OF THE INVENTION

These problems are solved by a transmitting terminal test code sequence generator that includes a maximal length linear feedback shift register having m stages for generating a first pseudorandom sequence of binary signals. The first pseudorandom sequence of binary signals is delayed by n time slots into a second pseudorandom sequence of binary signals. A circuit merges the first and second pseudorandom sequences of binary signals into a combined quasirandom sequence of signals on the transmission line. The first and second pseudorandom sequences of binary signals can be separated at each regenerator and errors can be detected by comparing the detected sequences with each other.

BRIEF DESCRIPTION OF THE DRAWINGS

The invention may be better understood by reading the following detailed description when that description is read with reference to the attached drawings wherein FIG. 1 is a block diagram of part of a digital transmission system;

FIG. 2 is a block diagram of terminal circuitry used for generating and transmitting a quasirandom test sequence of four-level signals;

FIG. 3 is a logic table for producing a four-level, or quaternary, signal from a pair of binary signals;

DETAILED DESCRIPTION

Figure 4:
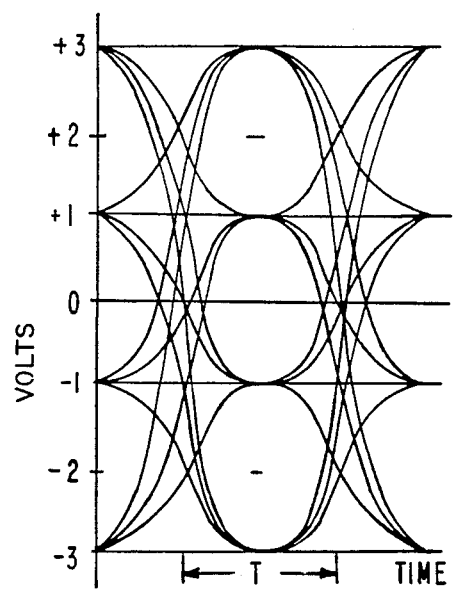
FIG. 4 is an eye diagram for a four-level signal.

Referring now to FIG. 1, there is shown a part of a digital transmission system. The part shown includes the data transmitting and fault locating equipment 10 of the west terminal together with two eastbound regenerators 20 and 30 and their associated repeater fault location circuits 40 and 50.

In the data transmitting and fault locating equipment 10, there is a source of data 11 which includes a pair of digital transmission lines 14, such as T1 carrier lines, that operate concurrently at a common bit rate. During regular operation, the sequences of binary signals from the two digital transmission lines 14 are applied to and are forwarded through a multiplexer 12 to a converter 13. These two sequences of binary signals from the pair of digital transmission lines 14 are merged together by the code converter 13. When merged by the code converter 13, the resulting single sequence of data is a four-level, or quaternary, signal which is transmitted along the transmission line 16 to the first regenerator 20. After being detected and regenerated by the regenerator 20, the four-level signal is transmitted further along the transmission line 16 and through the regenerator 30 to additional regenerators and an east terminal, which are not shown. Only the west-to-east direction of transmission is shown, however, in a typical system there also is equipment for the east-to-west direction of a transmission.

When a malfunction arises, fault testing and locating circuitry is activated under control of a circuit 15. The fault testing and locating circuitry includes a code sequence generator 17 that produces a pair of binary code sequences which are applied to the multiplexer 12 over the two lines 21. Either a sequence with periodic violations or a sequence without periodic violations can be generated. In the fault testing mode, the control circuit 15 selects which of those sequences is generated and applies a control signal to the multiplexer 12 causing the multiplexer to disable transmission of the pair of sequences of binary signals from the digital transmission lines 14 and to enable transmission of the pair of sequences of binary signals from the code sequence generator 17 to the code converter 13.

The two-level to four-level converter 13 converts the two transmitted sequences of binary signals into a four-level, or quaternary, signal for transmission to and through the regenerators 20 and 30 to the east terminal.

The transmitted test code sequence is selected advantageously so that any regularly transmitted data sequence of binary signals will not simulate the test code sequence. The test code sequence also is selected so that each of the repeater fault location circuits 40 and 50 can determine and record violations that occur as the test code sequence is being processed through the associated regenerators 20 and 30. Any test code violations are recorded. Subsequently this recorded error information is transmitted to the west terminal by way of a fault location line 60 in response to polling requests. In the west terminal, the error information from one or more repeaters is received by a fault location circuit 70 which determines a test error rate for each repeater. A more complete description of the fault location circuit arrangement in the west terminal 10 is disclosed in my concurrently filed patent application Ser. No. 867,212. The test error rates can be used to determine which repeater section is failing. Advantageously the test error rate information can be interpreted at a time when the failure is a soft failure, i.e., when the error rate has risen somewhat but before the transmission line has failed completely. Under such circumstances repairs can be made conveniently before a total failure occurs.

The advantages of this out-of-service error rate testing are achievable because of the selected test code sequence and the circuit arrangement for generating that test code sequence.

Referring now to FIG. 2, the test code sequence generator 17 includes a pseudorandom binary sequence generator which produces a maximal length pseudorandom sequence, as described in "Understanding Pseudo-Random Circuits" *Radio Electronics*, April 1975, pp. 42–49. Test code sequence generator 17 produces a pseudorandom sequence with a period $2^m - 1$, where m equals the number of stages in a maximal length shift register. An illustrative serial shift register 18 includes 9 stages with feedback from both the fifth stage and the last stage for generating a pseudorandom test code sequence containing 511 bits. Interestingly there are two last stages $S_9$ and $S_{9X}$. Feedback is taken from the last stage $S_9$. A lead 30 provides periodic violations which can be inserted selectively into the test code sequence at the input to stage $S_{9X}$. A signal on lead 22 determines whether or not the periodic violations are inserted.

Outputs to be transmitted from the shift register 18 are taken from the fifth stage $S_5$ and from the extra last stage $S_{9X}$ to produce two test code sequences. The two test code sequences are identical with each other except that the test code sequence taken from the stage $S_{9X}$ is delayed behind the other test code sequence by four clock cycles. Another exception is that the delayed test code sequence may have periodic violations inserted.

The periodic violations are generated as follows. Inputs to a gate 23 respond to a specifically selected state of the shift register 18. Every time the shift register 18 reaches the selected state, a pulse is produced by the gate 23. A divider circuit 24 divides the pulse repetition rate by eight and applies the result to an AND gate 25. When the signal on lead 22 is high, the output signal from the divider circuit 24 is applied by the AND gate 25 through the lead 19 to an EXCL OR gate 26. The other input of the EXCL OR gate 26 is one of the test code sequences tapped from the shift register 18. As a result, a violation is inserted periodically into that test code sequence.

The two output test code sequences are transmitted to the multiplexer 12. The first output test code sequence from the fifth stage $S_5$ is applied to the multiplexer 12 at an input $N_1'$. The delayed output test code sequence from the extra last stage $S_{9X}$ is applied to an input $N_2'$ of the multiplexer 12. A control signal on a lead 28 causes the multiplexer 12 to transfer the undelayed and the delayed test code sequences from the inputs $N_1'$ and $N_2'$ to inputs $IN_1$ and $IN_2$ of the two-level to four-level converter 13.

When the error testing arrangement is not being used and the regular digital transmission system is in service, the signal on the lead 28 changes the selection of inputs made by the multiplexer. At such times the undelayed and delayed test code sequences at the inputs $N_1'$ and $N_2'$ are disabled from transferring to the code converter 13. Instead the regular data sequences at the inputs $N_1$ and $N_2$ are transferred by the multiplexer to the inputs $IN_1$ and $IN_2$ of the code converter 13.

Whether the regular data sequences or the pseudorandom test code sequences are applied to the code converter 13, it converts the two binary sequences applied to its inputs into a single four-level signal on the transmission line 16. The resulting output is a quasirandom sequence of four-level signals.

Referring now to FIG. 3, there is shown a TABLE A which is a truth table for converting from two binary sequences to a single four-level signal. The four levels are selected to be $+3$, $+1$, $-1$, and $-3$. These four levels provide equal separation between adjacent levels for facilitating detection of the various levels. Each row in TABLE A represents the conversion of one possible pair of input bits into a corresponding output level. For instance the top row shows that an input pair of binary zeros is converted to the output level $+3$.

Referring now to FIG. 4, there is shown an eye-diagram for the resulting four-level signal.

Figure 5:
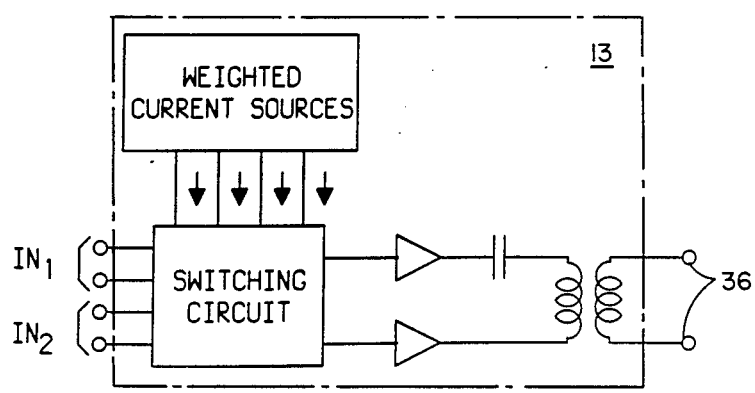
FIG. 5 is a block diagram of an arrangement for converting from a pair of binary signals to a four-level signal.

Referring now to FIG. 5, there is a block diagram of the code converter 13 used in FIGS. 1 and 2 for converting a pair of binary sequences on inputs $IN_1$ and $IN_2$ into a four-level signal on output leads 36. The arrangement and operation of the circuit 13 is presented in greater detail in a U.S. Pat. No. 4,606,046, issued in the name of J. J. Ludwick.

Detection of the four levels in the repeater 20 of FIG. 1 can be achieved by slicing the signal and determining whether the four-level signal is above or below $+2$, 0, and $-2$. The detector in the repeater 20 determines not only which level is being transmitted but also converts that level into the two binary sequences by reversing the operation of TABLE A.

When the quasirandom test code sequence is being transmitted by the converter 13 of FIG. 1, the conversion back into the two binary sequences in the repeater 20 produces the pseudorandom code sequence and the delayed version of the same sequence. Identical pseudorandom code sequences can be obtained directly by delaying the first sequence for four clock cycles. Comparing the resulting two pseudorandom code sequences with each other and recording any discrepancies provides an indication of the number of errors made during a test interval.

The indication of the number of errors is the information transmitted to the fault location circuit 70 by way of the fault location lead 60 in FIG. 1 in response to a polling request made by the control arrangement in the terminal 10.

A more complete description of the entire fault location system is included in the previously mentioned patent application, Ser. No. 867,212, filed concurrently herewith in my name.

The described embodiment together with other embodiments which are obvious in view thereof are considered to fall within the scope of the claims.

What is claimed is:

1. A digital transmission line fault location signal generator including means for generating a first sequence of binary signals, the signal generator being characterized by means for delaying the first sequence of binary signals by n time slots into a second sequence of binary signals; and means for synchronously merging the first and second sequences of binary signals into a combined sequence of signals on the transmission line, each different combination of input signals producing in the combined sequence an output signal that is distinct from the output signals of the other combinations of input signals.

2. A digital transmission line fault location signal generator, in accordance with claim 1, wherein
the merging means converts the first and second sequences of binary signals into a four-level signal.

3. A digital transmission line fault location signal generator, in accordance with claim 1, wherein
the first sequence of binary signals is a maximal length pseudorandom sequence.

4. A quaternary signal transmission line fault location signal generator comprising means for generating a first pseudorandom sequence of binary signals with a period $2^m - 1$, where m equals the number of stages in a maximal length shift register included within the generating means;

means for delaying the first pseudorandom sequence of binary signals by n time slots into a second pseudorandom sequence of binary signals, and means for synchronously converting the first and second pseudorandom sequences of binary signals into a quasirandom sequence of quaternary signals.

* * * * *

UNITED STATES PATENT AND TRADEMARK OFFICE
CERTIFICATE OF CORRECTION

PATENT NO. : 4,745,603

DATED : May 17, 1988

INVENTOR(S) : Dennis A. Shedd

It is certified that error appears in the above-identified patent and that said Letters Patent is hereby corrected as shown below:

Title page:

In the Abstract
  line 3, "m" should read --$\underline{m}$--.
  line 6, "n" should read --$\underline{n}$--.

In the Specification
  col. 1, line 58, "m" should read --$\underline{m}$--.
          line 61, "n" should read --$\underline{n}$--.
  col. 3, line 32, "m" should read --$\underline{m}$--.

In the Claims
  Claim 1
  col. 5, line 12, "n" should read --$\underline{n}$--.

Signed and Sealed this

Seventh Day of February, 1989

Attest:

DONALD J. QUIGG

*Attesting Officer*          *Commissioner of Patents and Trademarks*